US 12,414,900 B2

(12) United States Patent
Huhnen et al.

(10) Patent No.: US 12,414,900 B2
(45) Date of Patent: Sep. 16, 2025

(54) TRANSFER DEVICE FOR A CAPSULE AND CAPSULE FILLING MACHINE HAVING A TRANSFER DEVICE

(71) Applicant: Harro Hoefliger Verpackungsmaschinen GmbH, Allmersbach im Tal (DE)

(72) Inventors: Florian Huhnen, Allmersbach im Tal (DE); Steffen Gall, Allmersbach im Tal (DE); Jonathan Cocks, Allmersbach im Tal (DE); Reiner Wurst, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 179 days.

(21) Appl. No.: 17/860,767

(22) Filed: Jul. 8, 2022

(65) Prior Publication Data
US 2023/0010297 A1 Jan. 12, 2023

(30) Foreign Application Priority Data

Jul. 9, 2021 (EP) ..................................... 21184867

(51) Int. Cl.
*A61J 3/07* (2006.01)
*B65B 1/04* (2006.01)
*B65B 43/50* (2006.01)
*B65B 57/00* (2006.01)

(52) U.S. Cl.
CPC .............. *A61J 3/074* (2013.01); *A61J 3/071* (2013.01); *B65B 1/04* (2013.01); *B65B 43/50* (2013.01); *B65B 57/00* (2013.01); *B65G 2201/027* (2013.01)

(58) Field of Classification Search
CPC .... A61J 3/071; A61J 3/74; B65B 1/04; B65B 43/50; B65B 57/00; B65G 2201/027; B65G 47/80
See application file for complete search history.

(56) References Cited

U.S. PATENT DOCUMENTS 3,387,695 A * 6/1968 Hendrickson ........... A61J 3/074
198/383
3,756,402 A * 9/1973 Wagers, Jr. .............. A61J 3/074
209/543

(Continued)

FOREIGN PATENT DOCUMENTS

DE 199 22 228 A1 9/2000
DE 202021104040 U1 * 9/2021 .............. A61J 3/071
EP 4115871 A1 * 1/2023 .............. A61J 3/071

*Primary Examiner* — Robert F Long
*Assistant Examiner* — Eduardo R Ferrero
(74) *Attorney, Agent, or Firm* — Walter Ottesen, P.A.

(57) ABSTRACT

The disclosure relates to a transfer device of a capsule filling machine for transferring at least one capsule from a capsule receptacle of a capsule segment to a downstream process station, and to a capsule filling machine having such a transfer device. The transfer device includes a transport segment having at least one transport receptacle, which extends along a vertical longitudinal axis, wherein the transport receptacle is configured as a clamping receptacle having a clamping element, acting radially with respect to the longitudinal axis of the transport receptacle, for the capsule.

7 Claims, 3 Drawing Sheets

(56) References Cited

U.S. PATENT DOCUMENTS

| | | | | |
|---|---|---|---|---|
| 3,757,943 A * | 9/1973 | Chae | | G06V 20/66 |
| | | | | 209/912 |
| 4,172,380 A * | 10/1979 | Ansaloni | | A61J 3/074 |
| | | | | 73/864.33 |
| 4,964,262 A * | 10/1990 | Moser | | A61J 3/074 |
| | | | | 53/506 |
| 5,474,092 A * | 12/1995 | Moser | | B65B 7/2821 |
| | | | | 53/900 |
| 5,750,938 A * | 5/1998 | De Caris | | G01G 23/01 |
| | | | | 177/83 |
| 5,796,051 A * | 8/1998 | Chiari | | G01G 17/00 |
| | | | | 209/912 |
| 6,114,636 A * | 9/2000 | Cane' | | G01G 17/00 |
| | | | | 209/592 |
| 6,162,998 A * | 12/2000 | Wurst | | G01G 17/00 |
| | | | | 221/277 |
| 6,367,228 B1 * | 4/2002 | Wurst | | A61J 3/074 |
| | | | | 53/53 |
| 6,499,279 B1 * | 12/2002 | Yamamoto | | A61J 3/074 |
| | | | | 53/328 |
| 2003/0019797 A1 * | 1/2003 | Yamamoto | | A61J 3/074 |
| | | | | 209/649 |
| 2004/0249591 A1 * | 12/2004 | Trebbi | | G01N 22/00 |
| | | | | 702/81 |
| 2005/0007588 A1 * | 1/2005 | Tarozzi | | B07C 5/365 |
| | | | | 356/337 |
| 2008/0219803 A1 * | 9/2008 | Runft | | A61J 3/074 |
| | | | | 414/800 |
| 2010/0164144 A1 * | 7/2010 | Kuhnle | | A61J 3/074 |
| | | | | 425/139 |
| 2011/0222993 A1 * | 9/2011 | De Ruijter | | G01N 21/9508 |
| | | | | 414/222.01 |
| 2013/0129041 A1 * | 5/2013 | Runft | | G01N 23/083 |
| | | | | 378/56 |
| 2013/0206484 A1 * | 8/2013 | Consoli | | A61J 3/074 |
| | | | | 177/1 |
| 2014/0037061 A1 * | 2/2014 | Runft | | G01N 23/16 |
| | | | | 378/62 |
| 2015/0204714 A1 * | 7/2015 | Boehringer | | A61J 3/074 |
| | | | | 177/1 |
| 2018/0271750 A1 * | 9/2018 | Wurst | | B65B 7/2807 |
| 2019/0162582 A1 * | 5/2019 | Wurst | | G01G 17/00 |
| 2019/0298614 A1 | 10/2019 | Gall et al. | | |
| 2019/0367201 A1 * | 12/2019 | Jeschke | | G01N 27/24 |
| 2020/0408585 A1 * | 12/2020 | Wick | | A61J 3/074 |

\* cited by examiner

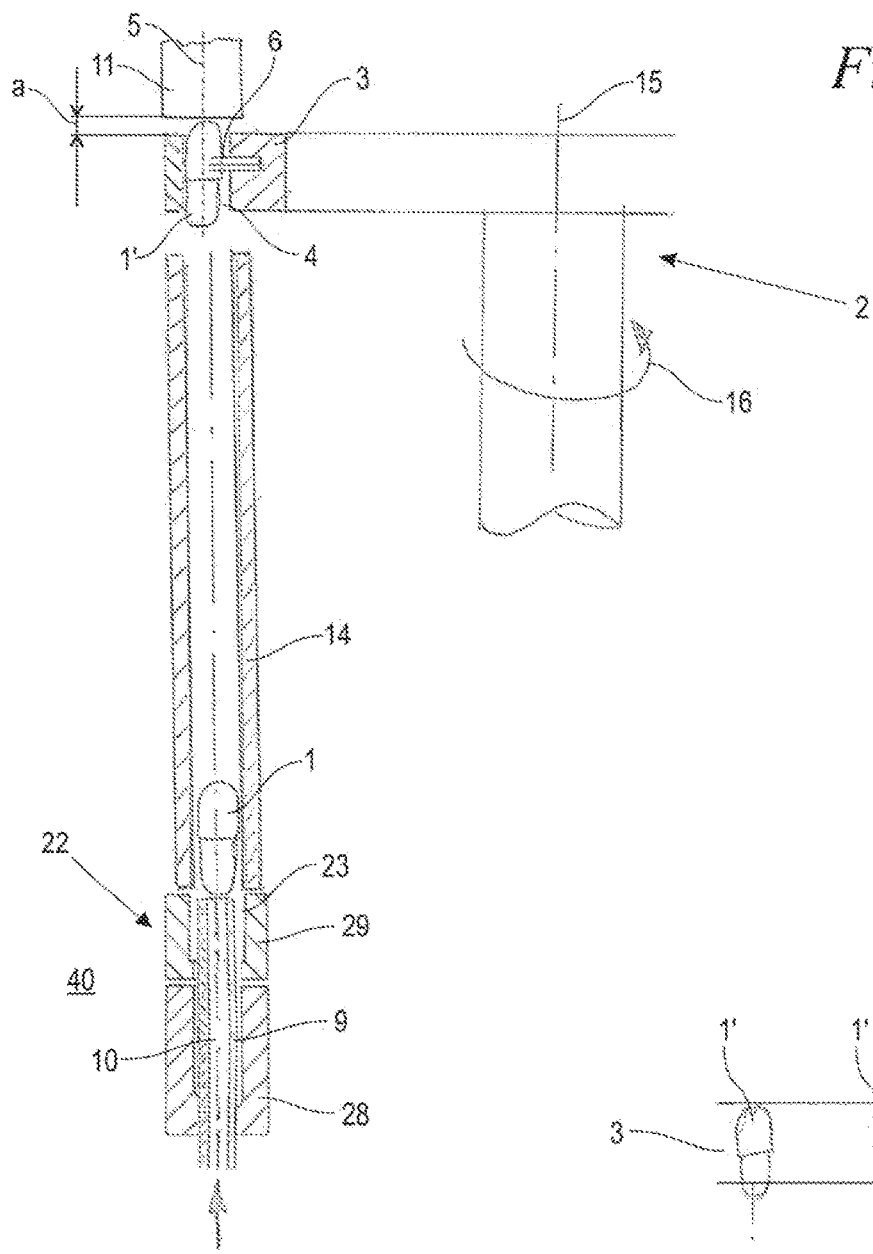
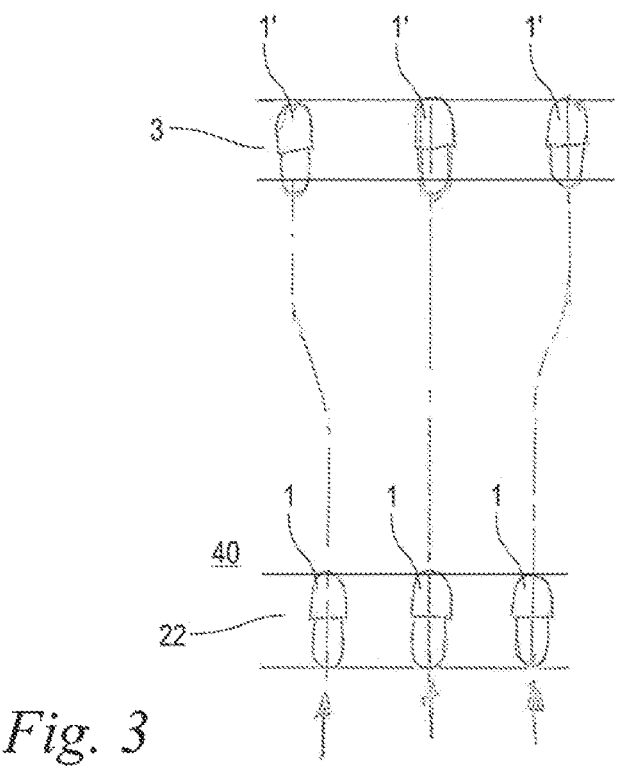
Fig. 2
Fig. 3

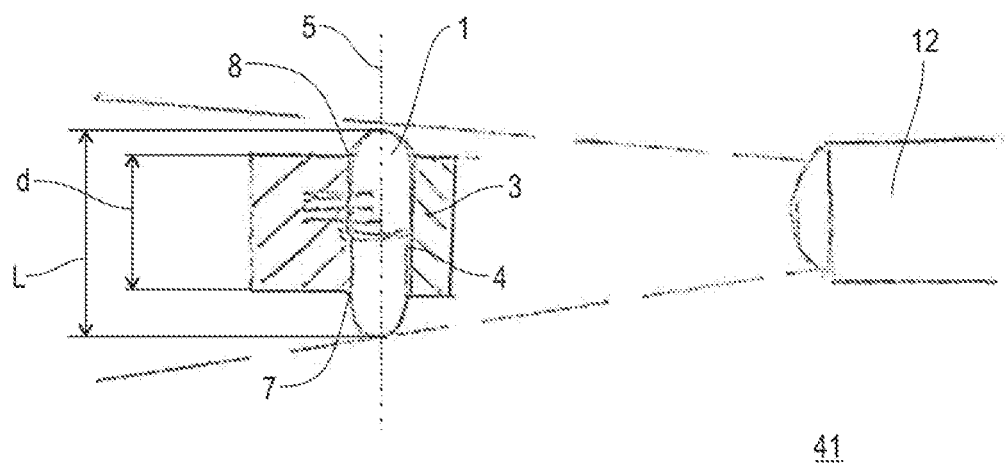
*Fig. 4*
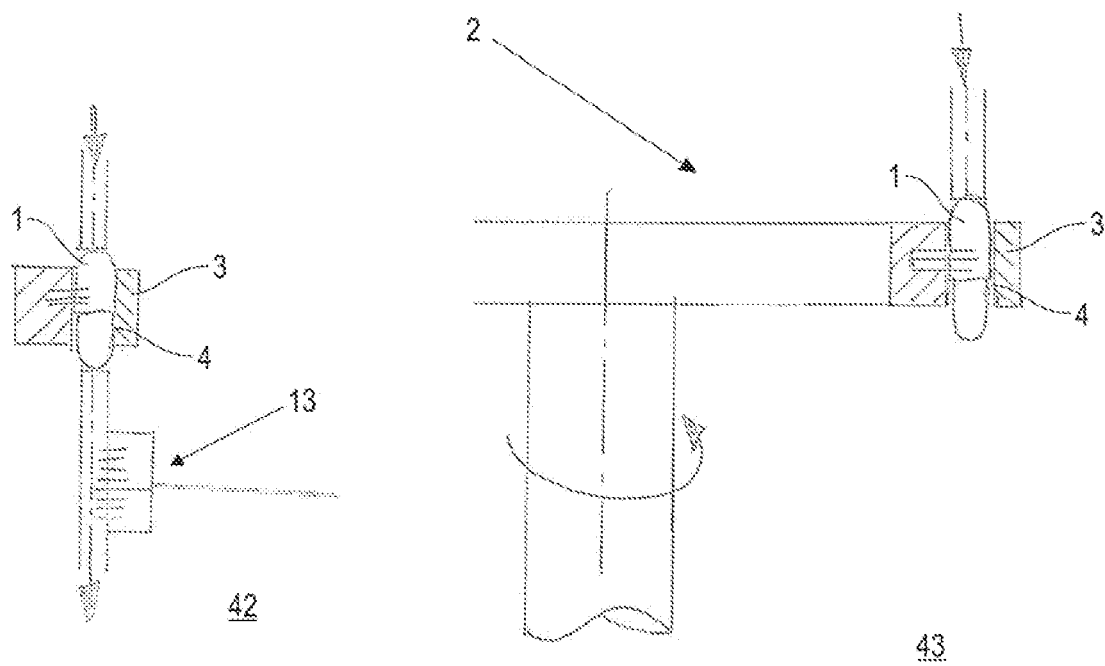
*Fig. 5*  *Fig. 6*

TRANSFER DEVICE FOR A CAPSULE AND CAPSULE FILLING MACHINE HAVING A TRANSFER DEVICE

CROSS REFERENCE TO RELATED APPLICATION

This application claims priority of European patent application no. 21184867.6, filed Jul. 9, 2021, the entire content of which is incorporated herein by reference.

TECHNICAL FIELD

The disclosure relates to a transfer device of a capsule filling machine for transferring at least one capsule from a capsule receptacle of a capsule segment to a downstream process station, and to a capsule filling machine having such a transfer device.

BACKGROUND

Pharmaceutical products, products from the field of food supplements or the like are frequently administered as a unit dose in a two-piece capsule, for example, a capsule made of hard gelatin. Such two-piece capsules are delivered in the empty state and filled with the desired content on capsule filling machines. For this purpose, use is made of capsule filling machines which are widely configured as rotary machines with a rotary table. So-called capsule segments are arranged on the rotary table and each have a plurality of capsule receptacles arranged in a row for in each case one capsule. The rotary table can be moved stepwise in a plane of rotation in such a way that the capsule segments pass sequentially through various processing stations. Typical steps which are carried out at the individual processing stations are the opening of the empty capsules, which are initially still closed, the filling and closing of the same, testing, ejection of bad capsules and finally the ejection of the capsules which are classified as satisfactory.

In the case of less demanding tasks, the satisfactory capsules can simply be ejected and fed in an unordered manner via a chute or the like to a downstream process station, for example, for packaging in blisters. In the case of higher requirements on process safety, with 100% control for example, ordered transfer of the capsules from the rotary table of the capsule carousel to such a downstream process station may be necessary.

SUMMARY

It is an object of the disclosure to provide a transfer device of a capsule filling machine for transferring at least one capsule from a capsule receptacle of a capsule segment to a downstream process station, which allows better testing of the capsule state.

This object can, for example, be achieved via a transfer device of a capsule filling machine for transferring at least one capsule from a capsule receptacle of a capsule segment to a downstream process station. The transfer device includes: a transport segment having at least one transport receptacle; the transport receptacle extending along a vertical longitudinal axis; and, the transport receptacle being a clamping receptacle having a clamping element for the capsule configured to act radially with respect to the longitudinal axis of the transport receptacle.

It is a further object of the disclosure to specify a capsule filling machine in which capsule testing is possible while maintaining the track assignment.

This object can, for example, be achieved via a capsule filling machine including: a rotary table having capsule segments arranged thereon; the capsule segments each having a plurality of capsule receptacles, wherein each capsule receptacle is configured for one capsule; a plurality of processing stations including an ejection station configured to eject the capsules from the capsule segment; the rotary table being configured to be moved stepwise about an axis of rotation such that the capsule segments pass sequentially through the plurality of processing stations; a transfer device arranged in a region of the ejection station; the transfer device being configured to transfer the capsule from at least one of the plurality capsule receptacles of at least one of the capsule segments to a downstream process station; the transfer device including a transport segment having at least one transport receptacle; the transport receptacle extending along a vertical longitudinal axis; and, the transport receptacle being a clamping receptacle having a clamping element for the capsule configured to act radially with respect to the longitudinal axis of the transport receptacle.

According to the disclosure, a transfer device and a capsule filling machine having such a transfer device are provided, wherein the transfer device includes a transport segment having at least one transport receptacle. The transport receptacle extends along a vertical longitudinal axis. Moreover, the transport receptacle is configured as a clamping receptacle having a clamping element, acting radially with respect to the longitudinal axis of the transport receptacle, for the capsule. The transport receptacle is rigid overall, while the clamping element is elastically yielding. For this purpose, a spring element, a foam, an elastomer or the like can be provided. The clamping element is expediently in the form of a brush. The clamping force acts frictionally, exclusively transversely to the direction of movement of the capsule, and therefore the capsule can be picked up and also ejected again solely by overcoming this clamping force. The disclosure provides a low-cost and functionally reliable device for transferring capsules to a downstream process station, which is functionally reliable in use at a high clock rate, and which can easily be adapted to the installation situation in terms of configuration.

It may be expedient to equip the transport segment with only one or with only a few transport receptacles. In an embodiment, the transport segment has a number of transport receptacles which corresponds to the number of capsule receptacles of the capsule segment. Moreover, a number of ejectors, in particular in the form of plungers, which likewise corresponds thereto is provided. In the preceding passage through the individual stations around the rotary table of the capsule filling machine, all the capsules had an individually assigned capsule receptacle in their respective capsule segment, and therefore they were moved on their own individual tracks. With the transport segment configured in an analogous manner, the transfer from the capsule carousel takes place while maintaining these tracks, thus enabling further processing of the capsules to take place accurately in respect of the track. For example, irregularities in the capsules can be identified in downstream test stations and assigned to a specific track. In this way, it is possible to determine whether a systematic deviation or even a systematic error has occurred in a particular track.

In a development of the abovementioned embodiment, the transport receptacles of the transport segment are arranged at a greater distance from one another than the capsule receptacles of the capsule segment. For bridging purposes, a corresponding number of transfer channels is positioned between the capsule receptacles and the transport receptacles at the ejection station. As the capsules pass through the transfer channels, the distance between them is increased by the desired amount, thus enabling subsequent process steps, such as testing or measuring operations, to be carried out more easily and with better accessibility. The transfer channels also entail that the transport segment comes to be located relatively high above the capsule segments. The gain in height achieved in this way creates installation space for additional components, such as a weighing cell.

Various means may be considered for transferring the capsules from the capsule segments through the transfer channels into the transport segment. According to various embodiments, the associated ejectors are configured as plungers for ejecting the capsules from the capsule receptacles and have an integrated compressed air channel for blowing the capsules through the transfer channels into the respective transport receptacle of the transport segment. The ejectors thus perform a dual function. First, they eject the capsules from their comparatively firm seat in the transport segments, for which purpose only a small plunger stroke is required. The subsequent, larger transport path through the transfer channels is then covered as a result of a blast of compressed air applied through the hollow plunger. The blast of compressed air is also sufficient to insert the capsule properly into the clamping receptacle according to the disclosure. A simple and operationally reliable drive for the comparatively large transfer path is formed.

The transport receptacle is expediently configured as a channel which passes through the transport segment and is open on both sides, having a lower opening and having an upper opening, wherein a first distance between the two openings is smaller than the length of the capsule. The channel which is open on both sides allows access to the capsule from both sides, both for testing and measurement purposes and for subsequent ejection of the capsule. The small distance between the two openings ensures that the capsule projects beyond the contour of the transport segment and can therefore be optically detected and/or scanned for testing and measurement purposes.

In an embodiment, in a manner corresponding to the ejectors already mentioned, a stop element is positioned immediately above the transport receptacle at a second distance from the upper opening, wherein the second distance is adapted to the length of the capsule in such a way that the capsule, in a state resting against the stop element, projects downward beyond the lower opening and upward beyond the upper opening. In other words, the stop element serves for accurately located axial positioning of the capsule in the transport segment in such a way that it projects on both sides. The transport segment can then be pivoted away from the effective range of the stop element, ensuring that both capsule ends are freely accessible.

Accordingly, the transport receptacle with the capsule held therein can be moved to a test station, wherein testing means for testing the capsule held in the capsule receptacle are arranged in the region of such a test station. Such testing means are, in particular, in the form of a measuring camera and/or in the form of a mechanical length measuring device and/or the like, and can detect suitable parameters of the capsule owing to the abovementioned capsule projection.

BRIEF DESCRIPTION OF THE DRAWINGS

The invention will now be described with reference to the drawings wherein:

FIG. 2 shows a schematic sectional illustration of the transfer device according to FIG. 1 when receiving a capsule from the capsule segment;

FIG. 3 shows a schematic illustration of the increase in the distance between the capsules during the transfer from the capsule segment to the transport segment;

FIG. 4 shows a schematic illustration of a capsule held in a clamping manner in the transport segment during camera detection;

FIG. 5 shows a schematic illustration of a capsule held in a clamping manner in the transport segment during length detection; and, FIG. 6 shows the arrangement according to FIG. 2 during capsule ejection for transfer to a downstream process station.

DESCRIPTION OF THE PREFERRED EMBODIMENTS

Figure 1:
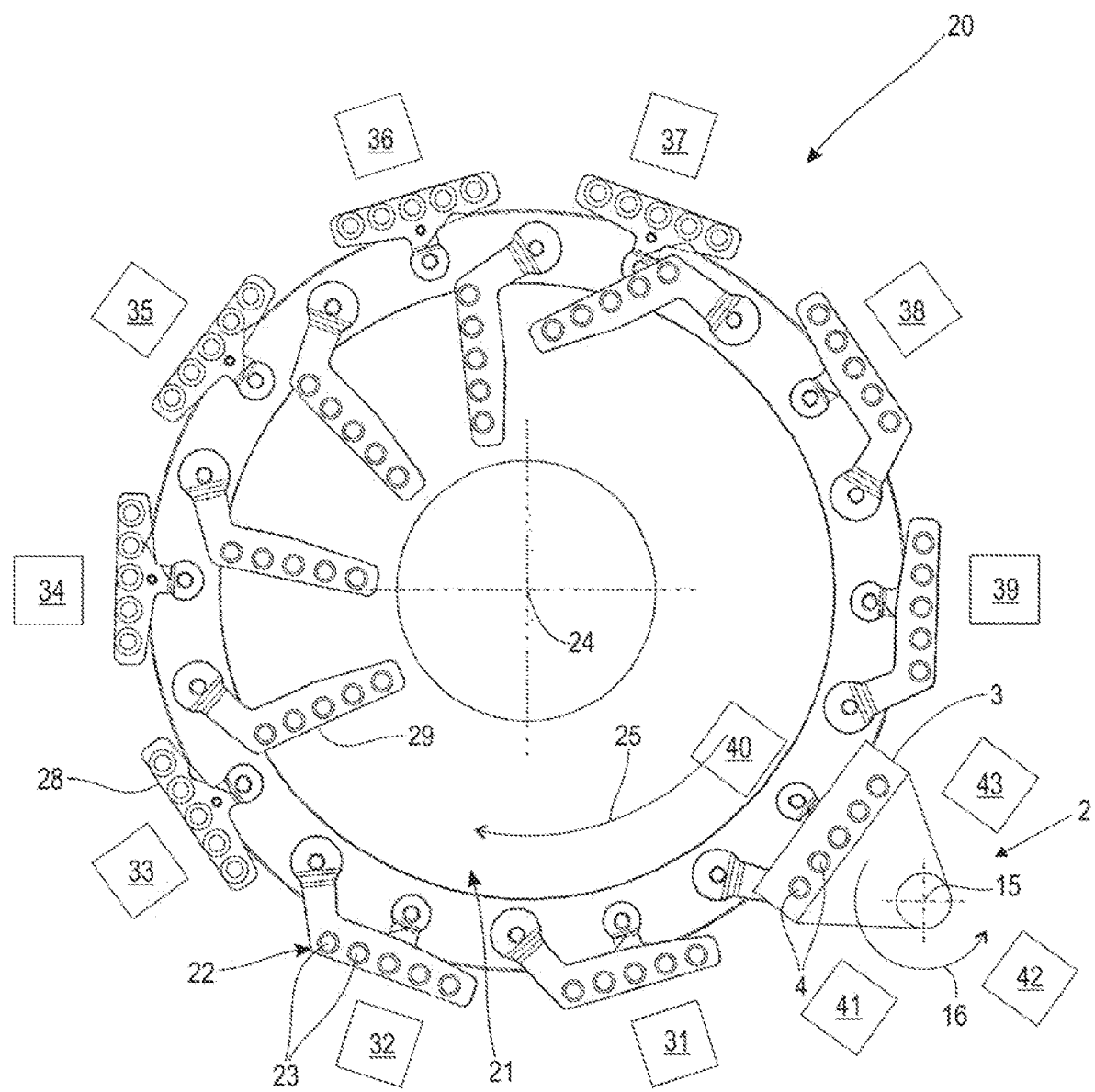
FIG. 1 shows a schematic plan view of a capsule filling machine in an embodiment according to the disclosure with a rotary table, with capsule segments on the rotary table, and with a transfer device for transferring at least one capsule from one of the capsule segments to a downstream process station.

FIG. 1 shows a plan view of the central part of a capsule filling machine 20 embodied according to the disclosure for filling capsules 1 (FIG. 2) with a filling material. The filling material can be provided in the form of a powder, granules, tablets or the like. It may be a pharmaceutical preparation, a food supplement or the like. The capsules 1 consist of a lower capsule part and an upper capsule part fitted onto the lower capsule part, which are both produced from hard gelatin, for example.

The capsule filling machine 20 according to FIG. 1 includes a rotary table 21, which can be driven to rotate about a vertical axis of rotation 24 in indexed steps in accordance with an arrow 25. A number of capsule segments 22 is arranged at uniform angular intervals on a peripheral region of the rotary table 21. In the embodiment shown, a total of ten capsule segments 22 is provided. However, some other number may also be expedient. In the preferred embodiment shown, the capsule segments 22 contain a number of capsule receptacles 23 for receiving the capsules 1, which are in each case arranged in a linear, rectilinear row. In the present case, each capsule segment 22 has a row of five capsule receptacles 23, although a different number may also be expedient.

It is clear from FIG. 1 that each capsule segment 22 consists of a lower segment part 28 fixedly attached to the peripheral region of the rotary table 21 and an upper segment part 29 pivotable relative thereto. Positioned around the rotary table 21 is a plurality of processing stations 31 to 40, which are fixed and therefore do not rotate with the rotary table 21, the stations being illustrated only schematically and not in detail. The number of processing stations 31 to 40 corresponds to the number of capsule segments 22, and therefore, in each rotary position of the rotary table 21, the position being indexed in angular steps, each capsule segment 22 comes to lie in the access region of in each case one of the processing stations 31 to 40.

According to the preferred embodiment shown, starting with the first two processing stations 31, 32, empty capsules consisting of the lower capsule part and the upper capsule part, which are initially fitted together provisionally, are inserted into the row of capsule receptacles 23, after which the fitted upper capsule part is then separated from the lower capsule part, even in normal operation. The next processing station is an elimination station 33. During the transition from the second insertion and separation station 32 to the elimination station 33, the upper segment part 29 with the upper capsule parts held therein is pivoted relative to the lower segment part 28 with the lower capsule parts held therein. Defective, non-separated empty capsules are eliminated in the elimination station 33.

Here, the elimination station 33 is followed by a total of three filling stations 34, 35, 36, in which the lower capsule parts held in the lower segment parts 28 are filled with the intended filling material. It may also be sufficient to provide only one or two filling stations.

After the last filling station 36 has been passed through, the upper segment part 29 is pivoted back into the aligned position relative to the lower segment part 28 in a pivoting-in station 37. In the subsequent closing station 38, the capsules 1 are closed by pushing the previously removed or separated upper capsule parts back onto the filled lower capsule parts and locking them in place. The closing station 38 is followed by a control station 39. In the control station 39, tested capsules 1 which are found to be bad are ejected. In a subsequent final station, namely in the ejection station 40, the remaining capsules 1, which have been found to be good, are ejected by means of plungers 9 or other ejectors illustrated in FIG. 2.

When passing through all the processing stations 31 to 40, the capsules 1 retain their assignment to in each case one individual capsule receptacle 23. This has the effect that all the capsules 1 of a capsule segment 22 follow their own individual "track".

According to the disclosure, a transfer device 2 is arranged in the region of the ejection station 40 for transferring one or more capsules 1 from the respective capsule receptacle 23 of the capsule segment 22 to a downstream process station. The transfer device 2 includes a transport segment 3 having at least one transport receptacle 4 for in each case one capsule 1 (FIG. 2). In the preferred embodiment shown, the transport segment 3 has a number of transport receptacles which corresponds to the number of capsule receptacles 23 of the capsule segment 22. Thus, analogously to the capsule segments 22 shown here by way of example, the transport segment 3 has a total of five transport receptacles 4. The transport receptacles 4 are positioned in the transport segment 3 in such a way that, in the initial position of the transfer device 2 according to FIG. 1, they lie exactly above the capsule receptacles 23 of the capsule segment 22 located in the ejection station 40 and are ready to receive one capsule 1 each. Owing to the unambiguous assignment of the individual transport receptacles 4 to in each case one capsule receptacle 23, the capsules 1 are taken over while maintaining an individual track.

FIG. 1 also shows that the transport segment 3 can be moved from the ejection station 40 to further process stations. This can be brought about by a linear movement. In the preferred embodiment shown, the transfer device 2 has a pivot bearing, by means of which the transport receptacle 4 can be moved in indexed steps about a pivot axis 15 in accordance with an arrow 16. It is thereby possible, by way of example, to approach three additional process stations, namely a first test station 41, a second test station 42 and a final forwarding station 43. Together with the already mentioned ejection station 40, a total of four stations is obtained, which are approached cyclically in 90° steps. However, a different number of process stations may also be expedient. Further details of the transfer device 2 according to the disclosure will become apparent from FIGS. 2 to 6 and the associated description below:

FIG. 2 shows a schematic sectional illustration of the transfer device 2 according to FIG. 1 when receiving a capsule 1 from a capsule receptacle 23 of a capsule segment 22. For this purpose, the transfer device 2 has first assumed the pivoting position according to FIG. 1, in which the transport segment 3 is located in the feed region of the ejection station 40, directly above the capsule segment 22 there. The capsule, which is initially held in the lower segment part 28 and in the upper part segment 29, is then ejected from its capsule receptacle 23 by ejectors and conveyed into the associated transport receptacle 4 of the transport segment 3. Here, the ejectors are configured as plungers 9 having a coaxially integrated compressed air channel 10. The number of these plungers 9 corresponds to the number of capsule receptacles 23 per capsule segment 22, and therefore, in the embodiment shown, a total of five such plungers 9 is arranged in the region of the ejection station 40, below the capsule segment 22. As a result, all the capsules 1 located in a capsule segment 22 can be transferred simultaneously into the transport segment 3 in a single process cycle.

FIG. 3 also shows, in a schematic illustration, some of the capsules 1 located in the capsule segment 22 at a certain lateral distance from one another. In the position designated 1' within the transport segment 3, however, they are at a greater lateral distance from one another in comparison therewith, in order to simplify subsequent process activities. For the widening of the lateral distance during the transfer from the capsule segment 22 to the transport segment 3, there is, according to FIG. 2, a transfer channel 14 positioned between each capsule receptacle 23 and each transport receptacle 4. Accordingly, the capsules 1 are conveyed from the capsule segment 22 through the associated transfer channel 14, with their lateral distance from one another widening, into the position designated 1' within the transport segment 3. According to FIG. 2, this takes place in two stages. In a first stage, the capsule 1 is ejected upward from its capsule receptacle 23 by means of the plunger 9. However, the range of action of the plunger 9 is limited to only the immediate region of the capsule segment 22. For the subsequent transport movement of the capsule 1 through the transfer channel 14, a blast of compressed air is applied to the capsule 1 from below through the compressed air channel 10, with the result that the capsule is blown through the transfer channel 14 into its assigned transport receptacle 4.

It can also be seen from the illustration according to FIG. 2 that the transport receptacles 4 extend along a vertical longitudinal axis 5 and are each configured as a clamping receptacle with a clamping element, acting radially with respect to the longitudinal axis 5, for the capsule 1'. Here, the clamping element is in the form of a brush 6 with radially aligned bristles. However, other forms of clamping elements may also be expedient. In any case, the clamping element presses the capsule 1' in the radial direction, that is, transversely with respect to the longitudinal axis 5, into a prismatic formation of the otherwise rigid transport receptacle 4. As a result, the capsule 1' is fixed in all directions that are transverse with respect to the longitudinal axis 5. For axial positioning, a stop element 11 is furthermore arranged immediately above each transport receptacle 4 in a manner corresponding to the ejectors or to the plungers 9. When measured in the direction of the longitudinal axis 5, the stop element 11 is located at a second distance a above the transport segment 3, more precisely above an upper opening 8, illustrated in FIG. 4, of the transport receptacle 4. The capsule 1 is thus blown into its assigned transport receptacle 4 by means of the blast of compressed air and, in the process, comes to rest against the stop element 11. This ensures exact axial positioning of the capsule 1' relative to the transport segment 3 with an upper projection by the amount of the second distance a.

FIG. 4 shows further details of the configuration of the transport segment 3 in the region of its transport receptacles 4. It can be seen that the transport receptacle 4 is configured as a channel which passes through the transport segment 3 and is open on both sides, at the top and also at the bottom, having a lower opening 7 and having an upper opening 8. In the vertical direction or in the direction of the longitudinal axis 5, the two openings 7, 8 are at a first distance d from one another. It can also be seen that the capsule 1 has a length L when standing upright, measured in the same direction, wherein the first distance between the two openings 7, 8 is smaller than the length L of the capsule 1. With additional reference to FIG. 2, it should also be noted that the second distance a of the stop element 11 from the upper opening 8 is adapted to the length L of the capsule 1 in such a way that the capsule 1 projects not only upward by the second distance a from the upper opening 8 but also downward from the lower opening 7.

Following the above-described transfer and positioning of the capsules 1' in their transport receptacles 4, the transport segment 3 is then pivoted from the ejection station 40 into the next process station, here into the first test station 41, as shown schematically in FIG. 4. The above-described projection of the capsules 1 upward and/or downward beyond the respective transport receptacle 4 allows the capsule 1 to be detected by testing means, even though the capsule 1 is held in the transport segment 3. In the embodiment shown, the testing means at the first test station 41 are configured as a measuring camera 12. This is capable of optically detecting the sections of the capsule 1 which project upward and downward beyond the transport segment 3. By image evaluation, a shape check can be carried out, which allows conclusions to be drawn about possible damage to the capsule.

As an alternative or in addition, testing means in the form of a mechanical length measuring device 13 can be provided in another test station 42 according to FIG. 5. In this case, the capsules 1 are measured with respect to their actual finished length by means of indicated caliper elements in conjunction with a measuring scale. This makes it possible to identify deviations in length, for example as a result of an incomplete closing process of the upper and lower parts of the capsule 1. As an alternative, it is also possible for other testing means to be provided, for example in the form of a balance for determining the mass of the capsules 1.

The abovementioned test stations 41, 42 with testing means in the immediate region of the transport receptacle 4 are optional. It may also be sufficient to provide only one forwarding station 43, which is shown in FIG. 6. This is based on the fact that subsequent process steps, such as cleaning, weighing and/or packaging, can also be performed outside the feed region of the transfer device 2. In any case, FIG. 6 also shows the transfer device 2 with the transport segment 3 pivoted to the forwarding station 43. Here, capsule ejection takes place for transfer to a further, downstream process station. For this purpose, the capsules 1 are ejected downward from their transport receptacles 4 of the transport segment 3 by appropriate ejectors, here in the form of plungers, and are transferred to the downstream process station while maintaining their track, that is, while maintaining their individual assignment to the respective transport receptacle 4 or capsule receptacle 23 (FIG. 1). The downstream process station can be an external process station (cleaning, weighing and/or packaging). However, within the scope of the disclosure, consideration may also be given to transferring the capsules 1 from the transport segment 3 back into the corresponding capsule segment 22 of the rotary table 21 of the capsule filling machine 20 (FIG. 1), in which case subsequent process steps are then carried out at corresponding process stations there.

It is understood that the foregoing description is that of the preferred embodiments of the invention and that various changes and modifications may be made thereto without departing from the spirit and scope of the invention as defined in the appended claims.

What is claimed is:

1. A capsule filling machine comprising:
a rotary table having capsule segments arranged thereon;
said capsule segments each having a plurality of capsule receptacles, wherein each capsule receptacle is configured for one capsule;
a plurality of processing stations including an ejection station configured to eject the capsules from said capsule segments;
said rotary table being configured to be moved stepwise about an axis of rotation such that said capsule segments pass sequentially through said plurality of processing stations;
a transfer device arranged in a region of said ejection station;
said transfer device being configured to transfer the capsule from at least one of said plurality of capsule receptacles of at least one of said capsule segments to a downstream process station;
said transfer device including a transport segment having at least one transport receptacle;
said transport segment being movable from said ejection station to a further of said plurality of processing stations;
said at least one transport receptacle extending along a vertical longitudinal axis; and,
said at least one transport receptacle being a clamping receptacle having a clamping element for the capsule configured to act radially with respect to the longitudinal axis of said transport receptacle, wherein said clamping receptacle is configured to exert a clamping force via said clamping element, wherein said clamping force acts frictionally, exclusively transversely to a direction of movement of the capsule such that the capsule can be received and ejected again solely by overcoming said clamping force.

2. The capsule filling machine of claim 1, wherein said transport segment has a number of transport receptacles which corresponds to a number of said capsule receptacles of said capsule segments; and, said ejection station has a number of ejectors which corresponds to the number of said capsule receptacles of said capsule segments.

3. The capsule filling machine of claim 2, wherein said ejectors are plungers.

4. The capsule filling machine of claim 2 further comprising:
a plurality of transfer channels;
said transport receptacles of said transport segment being arranged at a greater distance from one another than said capsule receptacles of said capsule segments; and,
said transfer channels being positioned between said capsule receptacles and said transport receptacles at said ejection station.

5. The capsule filling machine of claim 4, wherein said ejectors are plungers for ejecting the capsules from said capsule receptacles and have an integrated compressed air channel for blowing the capsules through said transfer channels into the respective ones of said transport receptacles of said transport segment.

6. The capsule filling machine of claim 1, wherein said clamping element is a brush.

7. A capsule filling machine comprising:
- a rotary table having capsule segments arranged thereon;
- said capsule segments each having a plurality of capsule receptacles, wherein each capsule receptacle is configured for one capsule;
- a plurality of processing stations including an ejection station configured to eject the capsules from said capsule segments;
- said rotary table being configured to be moved stepwise about an axis of rotation such that said capsule segments pass sequentially through said plurality of processing stations;
- a transfer device arranged in a region of said ejection station;
- said transfer device being configured to transfer the capsule from at least one of said plurality of capsule receptacles of at least one of said capsule segments to a downstream process station;
- said transfer device including a transport segment having at least one transport receptacle;
- said transport segment being movable from said ejection station to a further of said plurality of processing stations;
- said at least one transport receptacle extending along a vertical longitudinal axis; and,
- said at least one transport receptacle being a clamping receptacle having a plurality of bristles for the capsule aligned radially with respect to the longitudinal axis of said transport receptacle, wherein said clamping receptacle is configured to, via said plurality of bristles, exert a clamping force acts frictionally, exclusively transversely to a direction of movement of the capsule such that the capsule can be received and ejected again solely by overcoming said clamping force.

\* \* \* \* \*